United States Patent [19]

Sutherland

[11] Patent Number: 5,931,493
[45] Date of Patent: Aug. 3, 1999

[54] ACTUATABLE KNEE BOLSTER

[75] Inventor: Daniel R. Sutherland, Sterling Heights, Mich.

[73] Assignee: TRW Vehicle Safety Systems Inc., Lyndhurst, Ohio

[21] Appl. No.: 08/824,709

[22] Filed: Apr. 14, 1997

[51] Int. Cl.[6] .................................................. B60R 21/22
[52] U.S. Cl. ...................................... 280/730.1; 280/753
[58] Field of Search .............................. 280/730.1, 743.2, 280/753

[56] References Cited

U.S. PATENT DOCUMENTS

| | | | |
|---|---|---|---|
| 4,948,168 | 8/1990 | Adomeit et al. | 280/732 |
| 5,536,043 | 7/1996 | Lang et al. | 280/753 |
| 5,570,901 | 11/1996 | Fyrainer | 280/730.1 |

FOREIGN PATENT DOCUMENTS

| | | | |
|---|---|---|---|
| 42 43 791 | 6/1994 | Germany | 280/753 |

*Primary Examiner*—Kenneth R. Rice
*Attorney, Agent, or Firm*—Tarolli, Sundheim, Covell, Tummino & Szabo

[57] ABSTRACT

A vehicle occupant safety apparatus (10) includes a knee bolster (80) movable from a stored position adjacent to an instrument panel (40) of the vehicle to a blocking position spaced apart from the instrument panel. An actuator (30) for moving the knee bolster (80) from the stored position to the blocking position is supported on the instrument panel (40) by an actuator support (70). An attachment member (90) is connected with the knee bolster (80). The knee bolster (80) is movable relative to the attachment member (90) when the knee bolster is in the blocking position. The attachment member (90) is fixed to the instrument panel (40) adjacent to the actuator support (70). A plurality of tethers (100, 102) are connected between the knee bolster (80) and the attachment member (90) for controlling movement of the knee bolster relative to the attachment member. The actuator (30) preferably includes an inflatable device (52) which is inflatable to move the knee bolster (80) from the stored position to the blocking position. The tethers (100, 102) are located outside the inflatable device (52) and are the only connection between the knee bolster (80) and the instrument panel (40) when the knee bolster is in the blocking position.

6 Claims, 3 Drawing Sheets

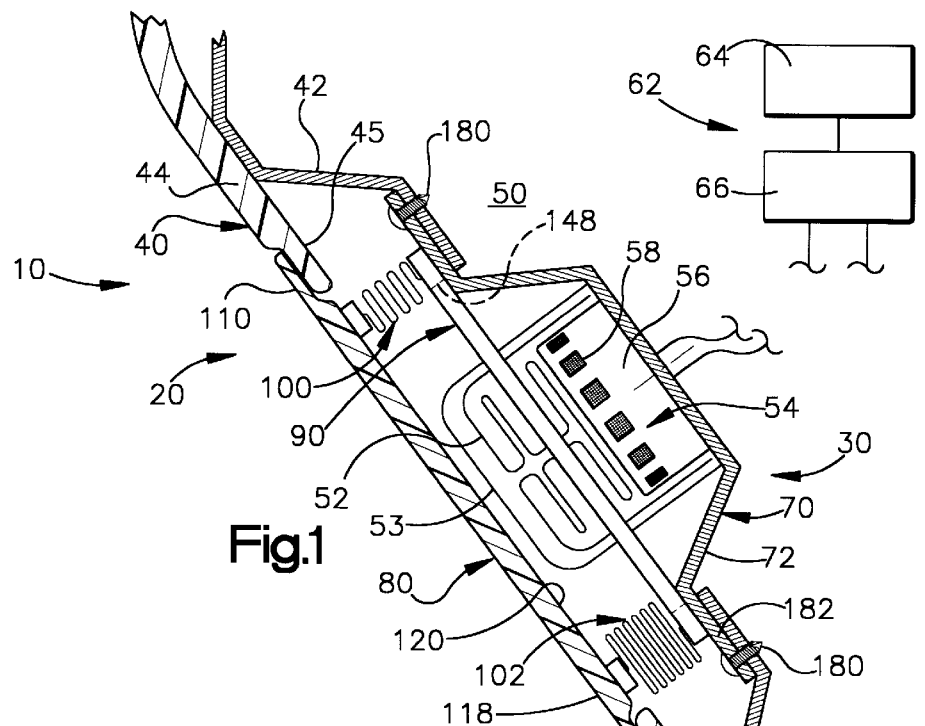
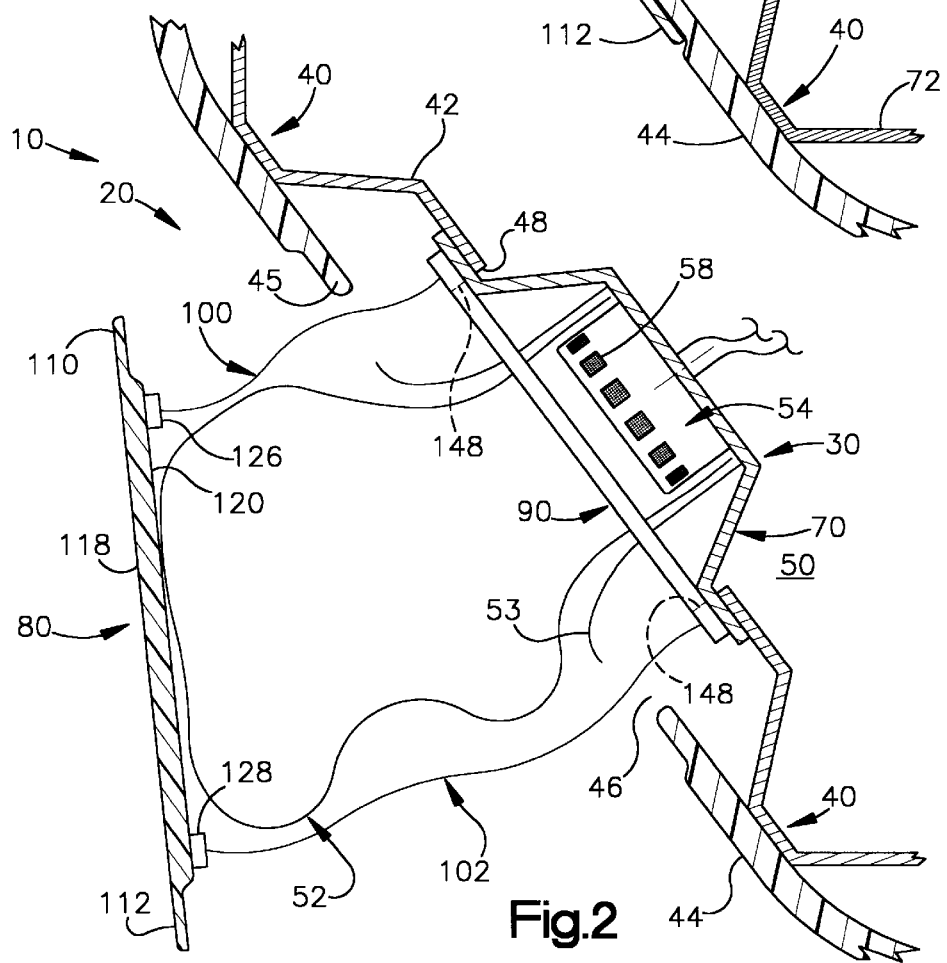

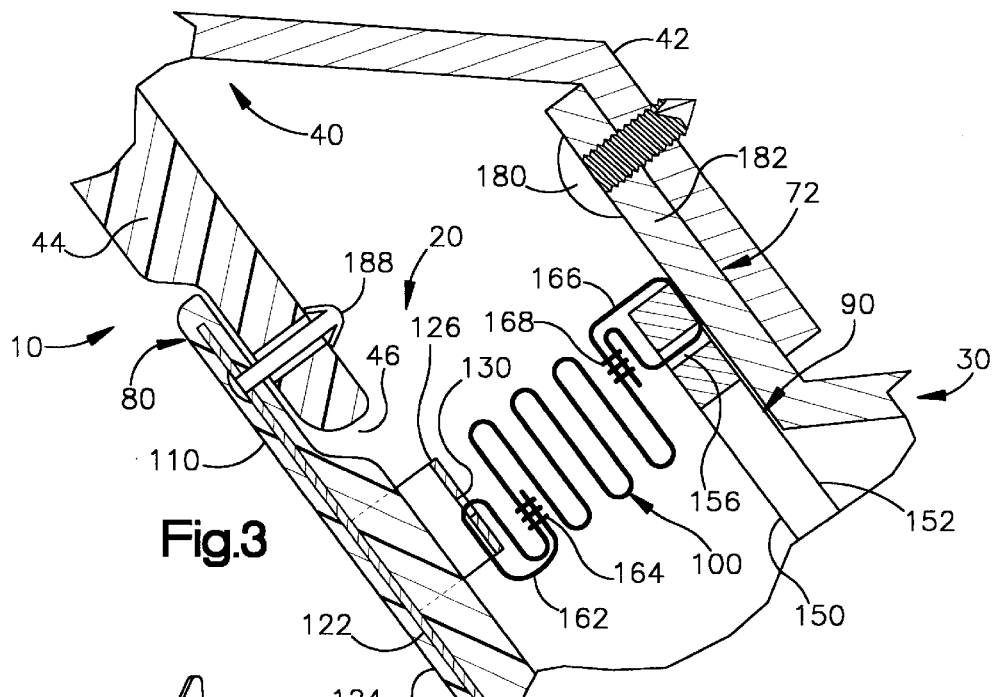
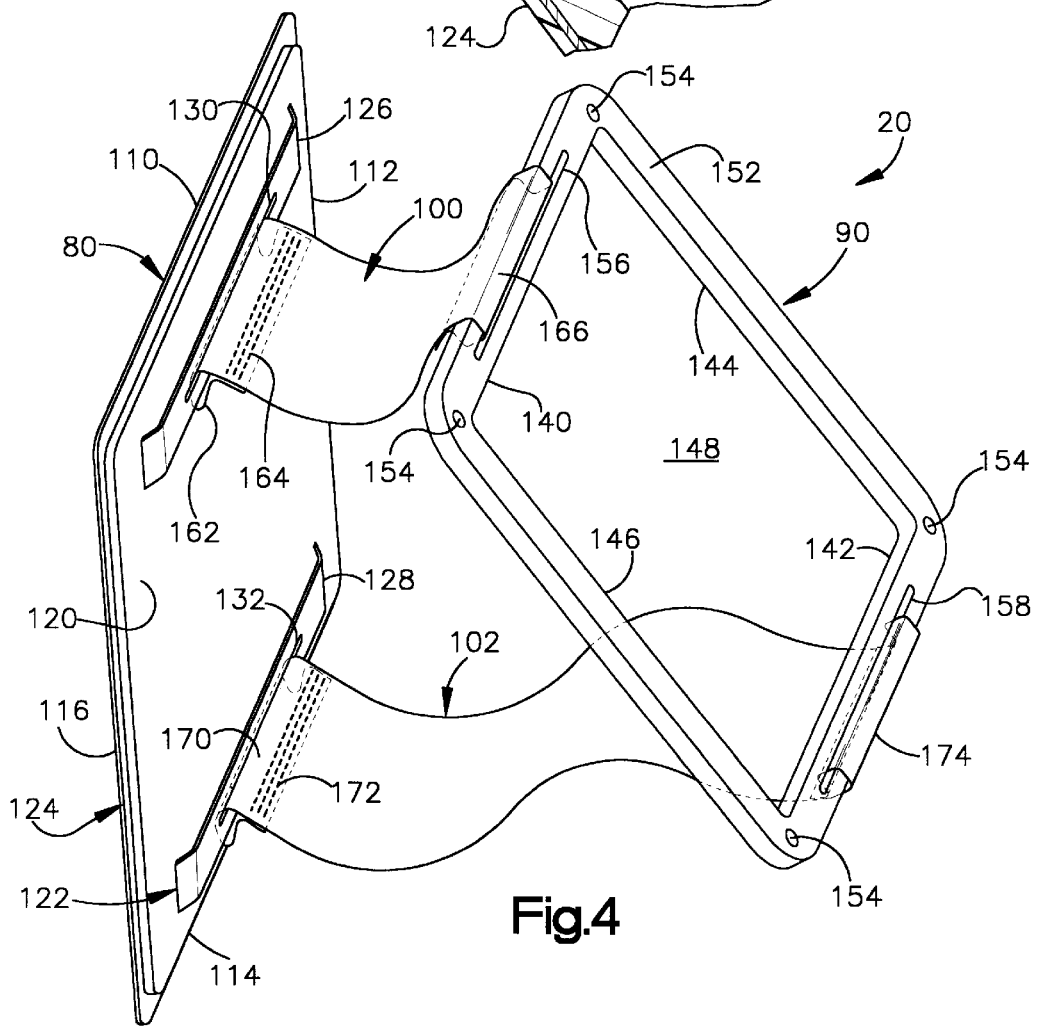

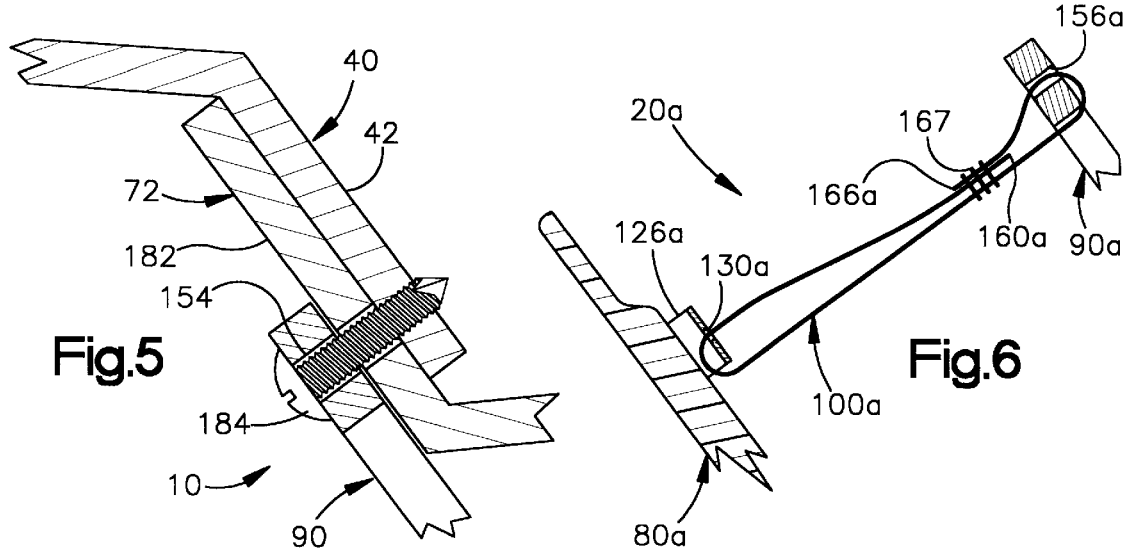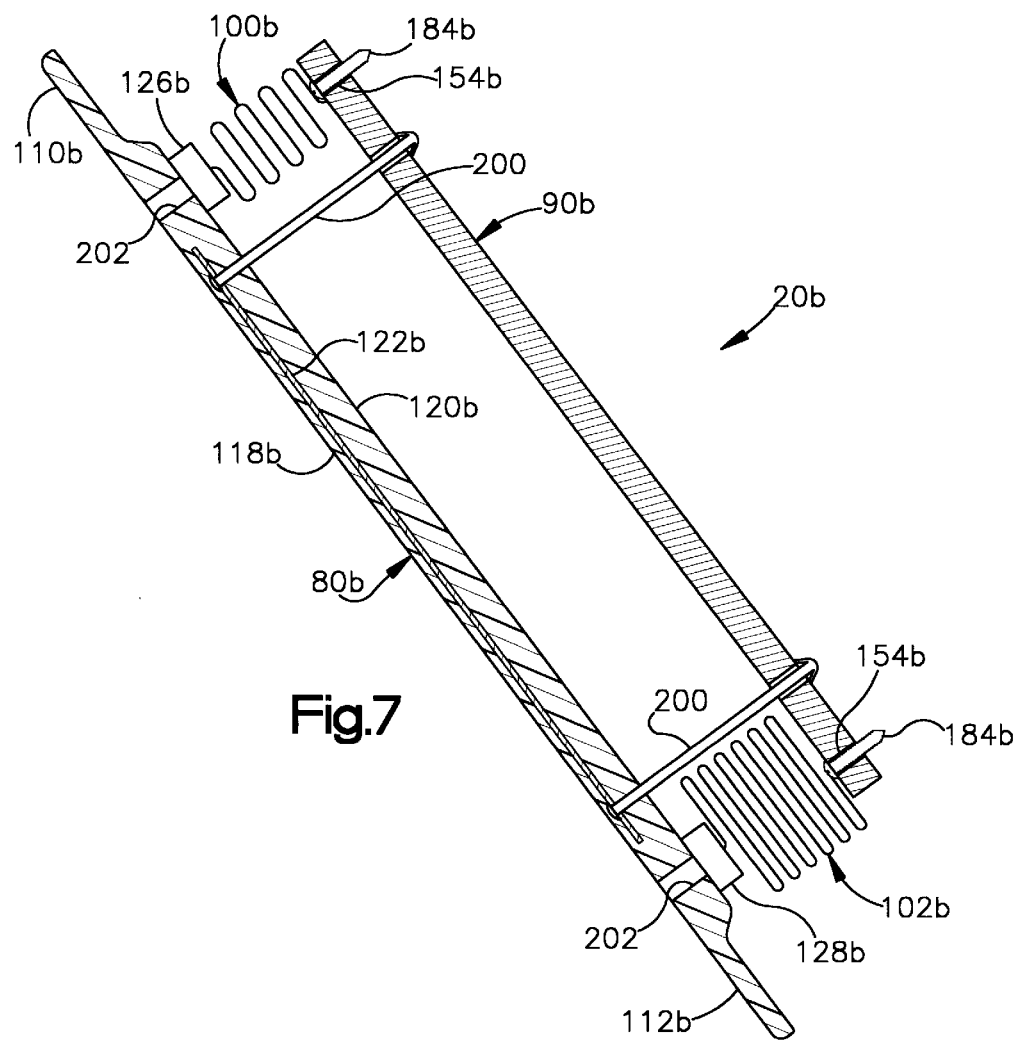

ACTUATABLE KNEE BOLSTER

BACKGROUND OF THE INVENTION

1. Technical Field

The present invention relates to an apparatus for helping to protect an occupant of a vehicle, and relates particularly to an apparatus including a knee bolster movable from a stored position adjacent to an instrument panel of the vehicle to a blocking position spaced apart from the vehicle instrument panel.

2. Description of the Prior Art

Actuatable vehicle occupant knee bolsters are known in the art. A knee bolster is located at a lower portion of a vehicle instrument panel and is movable from a stored position to a blocking position in response to detection of a vehicle crash condition. The knee bolster can help to prevent the vehicle occupant from "submarining" underneath an inflated air bag. Knee bolster systems have been developed that use an inflatable device, such as an air bag, for moving the knee bolster. Examples of such systems are disclosed in U.S. Pat. Nos. 5,536,043 and 5,570,901.

SUMMARY OF THE INVENTION

The present invention is an apparatus for helping to protect an occupant of a vehicle. The apparatus includes a knee bolster movable in the vehicle from a stored position adjacent to an instrument panel of the vehicle to a blocking position spaced apart from the vehicle instrument panel. The apparatus also includes an actuator for moving the knee bolster from the stored position to the blocking position, and actuator support means for supporting the actuator on the vehicle instrument panel. An attachment member is connected with the knee bolster. The knee bolster is movable relative to the attachment member when the knee bolster is in the blocking position. The apparatus further includes means for fixing the attachment member to the vehicle instrument panel adjacent to the actuator support means. A plurality of tethers are connected between the knee bolster and the attachment member for controlling movement of the knee bolster relative to the attachment member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view, partially in section, of a vehicle occupant safety apparatus in accordance with the present invention, including a knee bolster shown in a stored condition;

FIG. 2 is a view similar to FIG. 1 showing the knee bolster in an actuated or blocking condition;

FIG. 3 is an enlarged view of a portion of FIG. 1;

FIG. 4 is a perspective view of portions of the apparatus of FIG. 1;

FIG. 5 is an enlarged view similar to FIG. 3 of another portion of FIG. 1;

FIG. 6 is a schematic partial view of a vehicle occupant safety apparatus in accordance with a second embodiment of the present invention; and FIG. 7 is a schematic partial view of a vehicle occupant safety apparatus in accordance with a third embodiment of the present invention.

DESCRIPTION OF PREFERRED EMBODIMENTS

The present invention relates to an apparatus for helping to protect an occupant of a vehicle. In particular, the present invention relates to a vehicle occupant safety apparatus including a knee bolster movable from a stored position adjacent to an instrument panel of the vehicle to a blocking position spaced apart from the vehicle instrument panel. As representative of the present invention, FIG. 1 illustrates a vehicle occupant safety apparatus 10. The safety apparatus 10 includes a knee bolster assembly or blocking assembly 20 and an actuator 30.

The safety apparatus 10 is mounted in a lower portion of a vehicle instrument panel indicated schematically at 40. The lower portion of the instrument panel 40 is the portion of the instrument panel which a vehicle occupant's knees would contact were the occupant to slide forward from a seated position to contact the instrument panel.

The instrument panel 40, which is of a known construction, includes a metal substrate 42 which supports a trim pad or cover 44. An edge portion 45 of the cover 44 defines a generally rectangular opening 46 (FIG. 2) in the cover. The opening 46 in the cover 44 is generally aligned with an opening 48 in the substrate 42. The openings 46 and 48 provide access to a chamber 50 in the instrument panel 40.

The actuator 30 is located in the chamber 50 of the instrument panel 40. The actuator 30 preferably includes an inflatable device in the form of an air bag illustrated schematically at 52, although other types of actuators can, alternatively, be used. A tearable wrap 53 maintains the air bag 52 in a predetermined folded configuration. The air bag 52 is in fluid communication with an inflator 54. The inflator 54 has a cylindrical outer housing 56 with a plurality of fluid outlets 58 arranged to direct inflation fluid into the air bag 52.

The inflator 54 is electrically connected to an actuation circuit 62. The actuation circuit 62 includes a crash sensor 64, such as an inertia switch or an accelerometer, and a controller 66. Upon detection of a crash condition requiring occupant protection, as sensed by the crash sensor 64, the controller 66 controls the actuation circuit 62 so that the actuation circuit sends an electric signal to the inflator 54 to actuate the inflator. When the inflator 54 is actuated, the inflator 54 emits inflation fluid under pressure from the fluid outlets 58 to inflate the air bag 52, as described below.

The safety apparatus 10 includes actuator support means 70 for supporting the actuator 30 on the vehicle instrument panel 40. The actuator support means 70 includes a reaction canister or other type of mounting member illustrated schematically at 72 for mounting the inflator 54 and the air bag 52 to the instrument panel 40. The inflator 54 and the air bag 52 are secured in a known manner (not shown) to the reaction canister 72.

The knee bolster assembly 20 includes a knee bolster 80, an attachment member or attachment frame 90, and a pair of tethers 100 and 102 for controlling movement of the knee bolster relative to the attachment member. As described below in detail, the knee bolster assembly 20 is separate and detachable from the actuator 30. The knee bolster assembly 20 can, therefore, be manufactured, shipped, and installed separately from the actuator 30, if desired.

The knee bolster 80 is configured to close the opening 46 in the instrument panel 40. In the illustrated embodiment, the knee bolster 80 has a generally rectangular configuration as best seen in FIG. 4 including four edge portions 110, 112, 114, and 116. The knee bolster 80 has a generally planar configuration including opposite first and second major side surfaces 118 and 120 (FIG. 2).

The knee bolster 80 includes a relatively rigid metal substrate 122 (FIG. 3) and a plastic body portion 124. The body portion 124 of the knee bolster 80 is, preferably, made from a resilient material for cushioning contact between the knee bolster and an occupant of the vehicle.

The metal substrate 122 of the knee bolster 80 includes upper and lower tether attachment strips 126 and 128 (FIGS. 2 and 4) which project from the second major side surface 120 of the knee bolster. A slot 130 (FIGS. 3 and 4) in the upper attachment strip 126 extends for a substantial portion of the width of the upper attachment strip. A slot 132 (FIG. 4) in the lower attachment strip 128 extends for a substantial portion of the width of the lower attachment strip.

The attachment frame 90 connects the tethers 100 and 102 in a force-transmitting relationship with the instrument panel 40. The attachment frame 90 is separate and detachable from the actuator 30 and its mounting means 70, and is connectable with the instrument panel 40 separately from the actuator.

The attachment frame 90 is generally similar in overall configuration to the knee bolster 80. The attachment frame 90 has an open, rectangular configuration best seen in FIG. 4. Spaced apart, non-adjacent upper and lower portions 140 and 142 of the attachment frame 90 are interconnected by first and second side portions 144 and 146. The frame portions 140–146 define a central inflation opening 148 which extends through the attachment frame 90 between first and second major side surfaces 150 and 152 (FIG. 3) of the attachment frame.

Fastener openings 154 (FIG. 4) are located at each corner of the attachment frame 90. A slot 156 in the upper portion 140 of the attachment frame 90 extends between the first and second major side surfaces 150 and 152 of the attachment frame. A slot 158 in the lower portion 142 of the attachment frame 90 extends between the first and second major side surfaces 150 and 152 of the attachment frame. The slots 156 and 158 have substantially the same width as the slots 130 and 132 in the tether attachment strips 126 and 128 of the knee bolster 80.

The tethers 100 and 102 extend between and interconnect the attachment frame 90 and the knee bolster 80. The tethers 100 and 102 are the only elements which connect the knee bolster 80 and the attachment frame 90. The tethers 100 and 102 are separate from the air bag 52 and from the other parts of the actuator 30.

Each one of the tethers 100 and 102 is preferably made from a sheet material such as a fabric material. One suitable material is 1,000 denier polyester, Style 310627, available from Milliken Research Corporation of Spartanburg, South Carolina. This material has a small amount of yield when stretched. The tethers 100 and 102 have a wide, panel-like configuration, rather than a narrow, strip-like configuration. For example, the tethers 100 and 102 may each be about 8 inches wide or more, depending on vehicle configuration and requirements.

An outer end portion 162 (FIGS. 3 and 4) of the upper tether 100 extends through the slot 130 in the upper attachment strip 126 of the knee bolster 80. The outer end portion 162 of the upper tether 100 is folded back on itself and sewn at 164 to connect the upper tether in a force-transmitting relationship with the knee bolster 80. An inner end portion 166 of the upper tether 100 extends through the upper slot 156 in the attachment frame 90. The inner end portion 166 of the upper tether 100 is folded back on itself and sewn at 168 to connect the upper tether in a force-transmitting relationship with the attachment frame 90.

An outer end portion 170 (FIG. 4) of the lower tether 102 extends through the slot 132 in the lower attachment strip 128 of the knee bolster 80. The outer end portion 170 of the lower tether 102 is folded back on itself and sewn at 172 to connect the lower tether in a force-transmitting relationship with the knee bolster 80. An inner end portion 174 of the lower tether 102 extends through the lower slot 158 in the attachment frame 90. The inner end portion 174 of the lower tether 102 is folded back on itself and sewn to connect the lower tether in a force-transmitting relationship with the attachment frame 90.

The safety apparatus 10 is assembled by, first, mounting the preassembled actuator 30 on the instrument panel 40. The actuator 30 is secured to the instrument panel substrate 42 by suitable fasteners, such as the screws illustrated at 180 (FIG. 3), extending through a flange portion 182 of the reaction canister 72.

After the actuator 30 is mounted on the instrument panel 40, the knee bolster assembly 20 is connected to the instrument panel. In a first step of this process, the attachment frame 90 is moved into engagement with the instrument panel 40 in a generally forward direction in the vehicle, that is, from left to right as viewed in FIGS. 1–3. The attachment frame 90 is fixed to the instrument panel 40 by fasteners such as the screws 184 (FIG. 5). In the illustrated embodiment, the screws 184 extend through the fastener openings 154 in the attachment frame 90, through openings in the flange portion 182 of the reaction canister 72, and into the instrument panel substrate 42. If the tethers 100 and 102 are not long enough to provide clearance between the knee bolster 80 and the attachment frame 90 for this assembly step, fastener access ports (not shown) in the knee bolster may be provided to allow for securing of the attachment frame to the instrument panel 40.

The attachment frame 90, when thus secured in position, is located relative to the actuator 30 so that the air bag 52 is inflatable through the inflation opening 148 in the attachment frame. The folded air bag 52 may project into the inflation opening 148 in the attachment frame, as seen in FIG. 1.

The connection of the attachment frame 90 to the instrument panel 40 can, alternatively, be made in other ways. For example, the reaction canister 72 could be provided with weld studs (not shown) projecting outward (to the left as viewed in FIG. 1) over which the attachment frame 90 is fitted and on which nuts are screwed to hold the frame in place. Other types of fasteners, such as rivets or snap pins, could alternatively be used.

After the attachment frame 90 is secured to the instrument panel 40, the knee bolster 80 is releasably secured to the instrument panel 40 by suitable fastening means such as the pins 188 (FIG. 3, not shown in FIGS. 1 and 2). Other releasable fastening means, such as hook and loop fasteners, could alternatively be used. The fastening means 188 maintains the knee bolster 80 in the stored condition illustrated in FIG. 1, adjacent to the instrument panel 40, until the actuator 30 is actuated.

When the knee bolster 80 is in the stored position, the tethers 100 and 102 are folded, as shown schematically in FIG. 1, between the attachment frame 90 and the knee bolster. The knee bolster 80 when in the stored position closes the opening 46 in the cover 44 of the instrument panel 40. The edge portions 110–116 of the knee bolster 80 overlie the edge portion 45 of the cover 44 of the instrument panel 40. The tethers 100 and 102 are located outside the air bag 52. The second major side surface 120 of the knee bolster 80 overlies the inflation opening 148 in the attachment frame 90.

Upon detection of a crash condition requiring occupant protection, as sensed by the crash sensor 64 in the actuation circuit 62, the inflator 54 is actuated. The inflation fluid produced by the inflator 54 flows through the fluid outlets 58 into the air bag 52 and inflates the air bag. The air bag 52 inflates in a rearward and downward direction in the vehicle, that is, to the left and down as indicated by the arrow in FIGS. 1–3.

As the air bag 52 inflates, the wrap 53 on the air bag tears open. The air bag 52 inflates through the inflation opening 148 in the attachment frame 90. The inflating air bag 52 pushes outward, between the tethers 100 and 102, against the second major side surface 120 of the knee bolster 80.

The force of the inflating air bag 52 overcomes the retaining force of the fastening means, and the knee bolster 80 breaks loose from the instrument panel 40. The inflating air bag 52 moves the knee bolster 80 away from the attachment frame 90, from the stored condition shown in FIG. 1 to a blocking position as shown in FIG. 2. The knee bolster 80, when in the blocking position shown in FIG. 2, is positioned to contact the knees of a vehicle occupant and block further movement of the vehicle occupant in a forward direction in the vehicle. This blocking action can help to protect the vehicle occupant by preventing contact between the vehicle occupant and the instrument panel 40, and by preventing the vehicle occupant from "submarining" underneath an inflated air bag.

When the air bag 52 is at least partially inflated, the tethers 100 and 102 are fully extended and are stretched tight. The tethers 100 and 102 control movement of the knee bolster 80 relative to the attachment frame 90 by limiting the amount of movement of the knee bolster away from the attachment frame. When the knee bolster 80 is in the blocking position, the tethers 100 and 102 are the only connection between the knee bolster and the instrument panel 40.

FIG. 6 illustrates a portion of an alternative knee bolster assembly 20a which may be substituted in the safety apparatus 10 for the knee bolster assembly 20. Parts of the knee bolster assembly 20a which are the same as or similar to parts of the knee bolster assembly 20 are given the same reference numeral with the suffix "a" added for clarity.

In the knee bolster assembly 20a, each one of the tethers is configured as a loop. The upper tether 100a has two end portions 160a and 166a sewn to each other at 167. The looped upper tether 100a extends through the slot 130a in the upper attachment strip 126a on the knee bolster 80a and through the upper slot 156a in the attachment frame 90a.

In a similar manner, the lower tether 102a (not shown) of the bolster assembly 20a has two end portions sewn to each other to form a loop. The looped lower tether is connected between the lower attachment strip of the knee bolster 80a and the attachment frame 90a.

The knee bolster assembly 20a functions in the same manner as the knee bolster assembly 20. Because each of the upper and lower tethers 100a and 102a in the knee bolster assembly 20a needs be sewn at only one location, the knee bolster assembly 20a can be simpler to manufacture than the knee bolster assembly 20.

FIG. 7 illustrates an alternative knee bolster assembly 20b which may be substituted in the safety apparatus 10 for the knee bolster assembly 20. Parts of the knee bolster assembly 20b which are the same as or similar to parts of the knee bolster assembly 20 are given the same reference numeral with the suffix "b" added for clarity.

In the knee bolster assembly 20b, the knee bolster 80b is releasably secured to the attachment frame 90b rather than to the vehicle instrument panel. A plurality of breakaway fasteners 200 extend between and interconnect the knee bolster 80b and the attachment frame 90b when the knee bolster is in the stored position. One end of each fastener 200 is fixed to the knee bolster 80b. The other end of each fastener 200 is connected to the attachment frame 90b. The fasteners 200 provide a temporary, relatively rigid connection between the attachment frame 90b and the knee bolster 80b. The knee bolster 80b is movable with the attachment frame 90b. Openings 202 are provided in the knee bolster 80b, aligned with the fastener openings 154b in the attachment frame 90b, for enabling the attachment frame to be fixedly secured to the vehicle instrument panel (not shown).

The knee bolster assembly 20b functions in a similar manner to the knee bolster assembly 20 (FIG. 1). When the force of the inflating air bag increases to a predetermined amount, the fasteners 200 (FIG. 7) break and allow the knee bolster 80b to move away from the attachment frame 90b, from the stored condition shown in FIG. 7 to a blocking condition spaced apart from the attachment frame and from the vehicle instrument panel. When the knee bolster 80b is in the blocking position, the tethers 100b and 102b are the only connection between the knee bolster and the vehicle instrument panel. The temporary physical connection of the knee bolster 80b to the attachment frame 90b, provided by the fasteners 200, can allow for easier assembly of the knee bolster assembly 20b to the vehicle instrument panel, and can improve shipping and handling of the knee bolster assembly since both all parts of the knee bolster assembly are movable as one package.

From the above description of the invention, those skilled in the art will perceive improvements, changes and modifications. For example, the attachment member can have a configuration or construction different from that of the illustrated attachment frame 90, so long as the attachment member connects the tethers in a force-transmitting relationship with the vehicle instrument panel, separate from the actuator and its mounting assembly. Such improvements, changes and modifications within the skill of the art are intended to be covered by the appended claims.

Having described the invention, I claim:

1. An apparatus for helping to protect an occupant of a vehicle, said apparatus comprising:

a knee bolster assembly including a knee bolster movable in the vehicle from a stored position adjacent to an instrument panel of the vehicle to a blocking position spaced apart from the vehicle instrument panel;

an inflatable device for moving said knee bolster from the stored position to the blocking position;

an actuatable inflator for inflating said inflatable device;

a module support for supporting said inflator and said inflatable device on the vehicle instrument panel;

first fastener means for fixing said module support to the vehicle instrument panel;

said knee bolster assembly further comprising an attachment frame separate and detachable from said module support, and a plurality of flexible tethers connected between said knee bolster and said attachment frame for limiting movement of said knee bolster away from said attachment frame upon actuation of said inflator;

second fastener means separate from said first fastener means for connecting said attachment frame to the vehicle instrument panel adjacent said module support to block movement of said attachment frame relative to the vehicle instrument panel;

said knee bolster assembly being movable as a unit relative to said module support and said inflator and said inflatable device when both (a) said module support is fixed to the vehicle instrument panel by said first fastener means and (b) said attachment frame is not fastened to the vehicle instrument panel by said second fastener means; and third fastener means separate from said first and second fastener means for releasably connecting said knee bolster to the vehicle instrument panel at a location spaced apart from said module support.

2. An apparatus as set forth in claim 1 wherein said attachment frame has an inflation opening, said inflatable device being inflatable through said inflation opening in said attachment frame to move said knee bolster from the stored position to the blocking position.

3. An apparatus as set forth in claim 2 wherein said attachment frame includes a plurality of interconnected portions extending around an inflation opening, said plurality of tethers including first and second tethers which are connected, respectively, to non-adjacent first and second ones of said portions of said attachment frame.

4. An apparatus as set forth in claim 1 wherein all sides of said knee bolster move away from said instrument panel when said knee bolster moves from the stored position to the blocking position.

5. An apparatus as set forth in claim 1 wherein all of said plurality of tethers are located outside of said inflatable device.

6. An apparatus as set forth in claim 1 wherein said attachment frame includes a plurality of interconnected portions extending around an inflation opening, said plurality of tethers including first and second tethers which are connected, respectively, to non-adjacent first and second ones of said portions of said attachment frame;

wherein all sides of said knee bolster move away from said instrument panel when said knee bolster moves from the stored position to the blocking position;

wherein all of said plurality of tethers are located outside of said inflatable device; and wherein said attachment frame has an inflation opening, said inflatable device being inflatable through said inflation opening in said attachment frame to move said knee bolster from the stored position to the blocking position.

* * * * *